United States Patent
Helrigel et al.

[15] 3,665,847
[45] May 30, 1972

[54] PRESS FRAME

[72] Inventors: Robert A. Helrigel; Roderick K. Ward, both of Hastings, Mich.

[73] Assignee: Gulf & Western Industrial Products Company, Grand Rapids, Mich.

[22] Filed: Jan. 14, 1971

[21] Appl. No.: 106,408

[52] U.S. Cl.................................100/231, 100/214, 248/23, 287/20 R
[51] Int. Cl.........................................................B30b 15/28
[58] Field of Search............100/214, 232; 74/586; 312/264, 312/265; 83/700, 701; 248/19, 23; 287/189.36 F, 20 R, 23; 72/455

[56] References Cited

UNITED STATES PATENTS

| | | | |
|---|---|---|---|
| 855,567 | 6/1907 | Grinberg | 287/20 R |
| 2,450,091 | 9/1948 | Kendall | 287/20 R |
| 3,288,192 | 11/1966 | Bollinger | 287/20 R |
| 2,602,508 | 7/1952 | Patrick | 100/232 X |

*Primary Examiner*—Billy J. Wilhite
*Attorney*—Meyer, Tilberry & Body

[57] ABSTRACT

A press frame includes spaced-apart legs having inner surfaces facing one another. Tie rods are releasably attached to the legs for holding the legs together. The connection between the legs and the tie rod is located entirely on the inner surfaces of the legs so that no projections appear on the outer surfaces of the legs.

18 Claims, 8 Drawing Figures

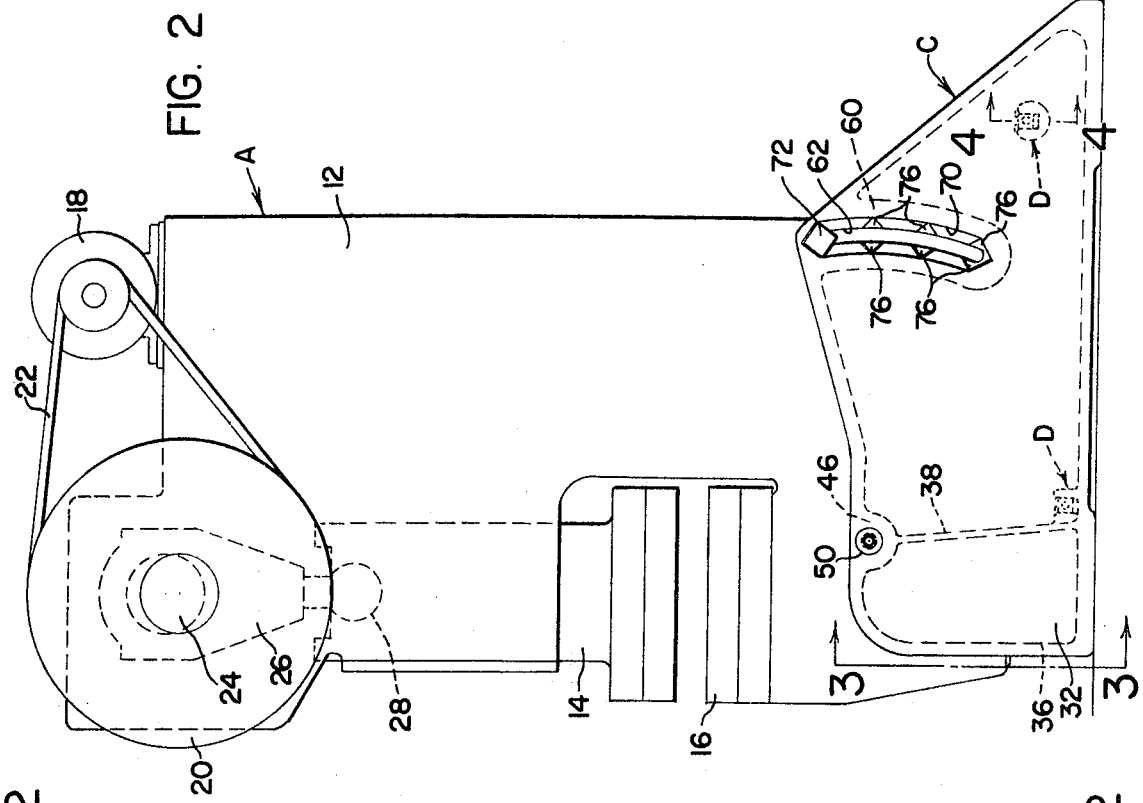
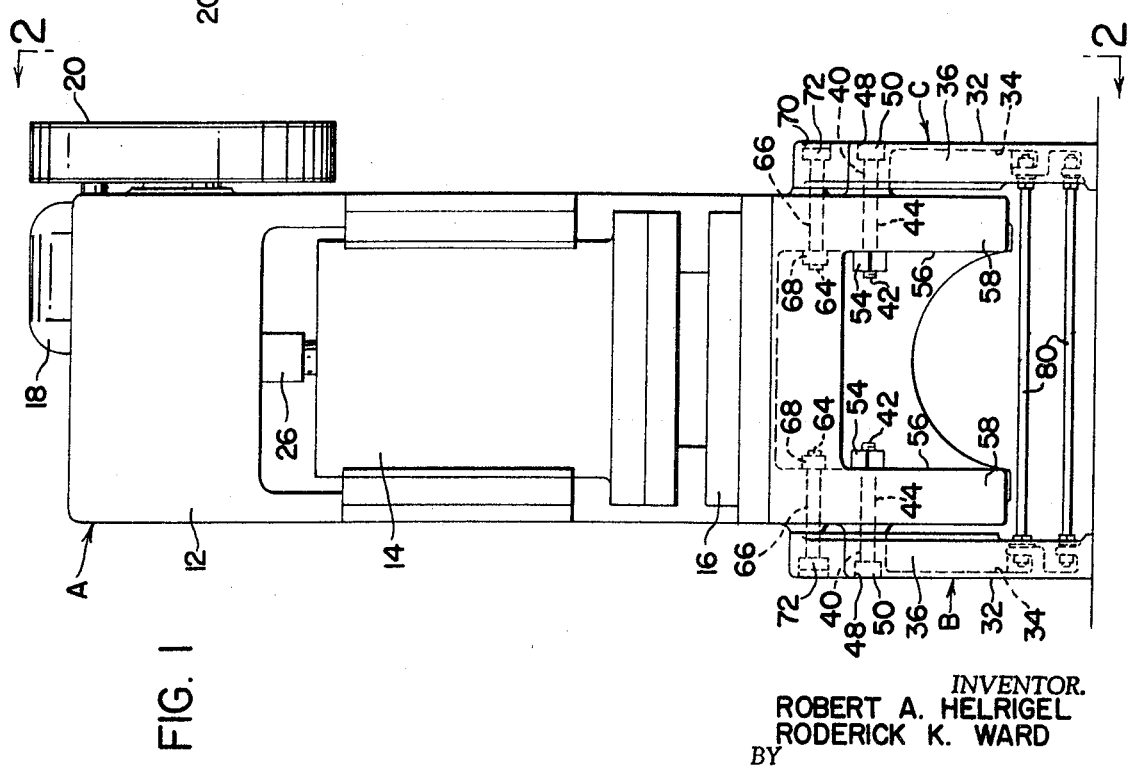
INVENTOR.
ROBERT A. HELRIGEL
RODERICK K. WARD
BY
Meyer, Tilberry & Body
ATTORNEYS INVENTOR.
ROBERT A. HELRIGEL
RODERICK K. WARD
BY
Meyer, Tilberry & Body
ATTORNEYS

PRESS FRAME

BACKGROUND OF THE INVENTION

This application pertains to the art of press frames and more particularly to arrangements for connecting the legs of press frames. The invention is particularly applicable to the legs of press frames and will be described with particular reference thereto although it will be appreciated that the invention has broader applications and can be used with other frame assemblies.

Legs for press frames are commonly held together by tie rods having nuts threaded on the opposite ends thereof. The ends of the tie rod extend through holes in the legs and nuts are threaded onto the ends of the rod on the outside surfaces of the legs. The end portions of the tie rod and nuts project outwardly beyond the outer surfaces of the legs and create a hazardous nuisance. Equipment being moved past the press can strike these projections and damage the moving equipment or the press. The operator of the press and the persons operating the moving equipment can also be injured due to these projections which are normally spaced upward from the floor and extend outwardly toward a traffic aisle. It would be desirable to eliminate such projections while maintaining a strong connection between the legs with an adjustable tie rod.

SUMMARY

A device of the type described is provided with brackets on the inner surfaces of the legs. The brackets are formed integral with the press legs and are designed for connection with a tie rod completely on the inner surfaces of the legs so that no projections appear on the outer surfaces of the legs.

In accordance with a preferred arrangement, the connection bracket on the inner surfaces of the legs includes a slot and a pair of arms located in spaced-apart relationship on opposite sides of the slot. The arms have inner surfaces facing the inner surfaces of the legs and are spaced outwardly from the inner surfaces of the legs to define a tie rod connecting space. A tie rod has a rod portion receivable in the slot and enlarged connecting means on the opposite end portions thereof for reception in the toe rod connecting space. Tensioning means is provided for placing the rod portion of the tie rod in tension and for drawing the enlarged connecting means on the opposite end portions of the rod toward one another to bear against the inner surfaces of the bracket arms for securely holding the legs together.

In accordance with one arrangement, the bracket and the enlarged connecting means on the opposite end portions of the rod include cooperating abutment means for holding the enlarged connecting means against rotation relative to the bracket. In one arrangement, the enlarged connecting means is defined by oppositely threaded nuts which are threaded onto the end portions of the tie rod. The tie rod connecting space is rectangular as are the nuts. The flat sides of the tie rod connecting space and of the nuts cooperate to define the abutment means which prevents rotation of the nuts relative to the brackets. The tie rod itself may be rotated for threading the nuts further onto the end portions of the rod to place the rod in tension and cause the nuts to move toward one another so they bear against the inner surfaces of the bracket arms.

In a preferred arrangement, the slot in the bracket is substantially U-shaped and extends substantially vertically. Both the slot and the tie rod connecting space have open upper portions so that a tie rod may be positioned above the brackets in a substantially horizontal position and lowered so that the rod is received in the slots and nuts on the ends of the rod are received in the tie rod connecting spaces. In accordance with another aspect of the invention, a pair of locking nuts are threaded onto the opposite end portions of the rod for engaging the outer surfaces of the bracket arms to securely lock the tie rod in position.

BRIEF DESCRIPTION OF THE DRAWING

The invention may take physical form in certain parts and arrangements of parts, a preferred embodiment of which will be described in detail in this specification and illustrated in the accompanying drawings which form a part hereof.

FIG. 1 is a front elevational view of a press having the improvement of the present invention incorporated therein;

FIG. 2 is a side elevational view looking in the direction of arrows 2—2 of FIG. 1;

DESCRIPTION OF THE PREFERRED EMBODIMENT

Figure 3:
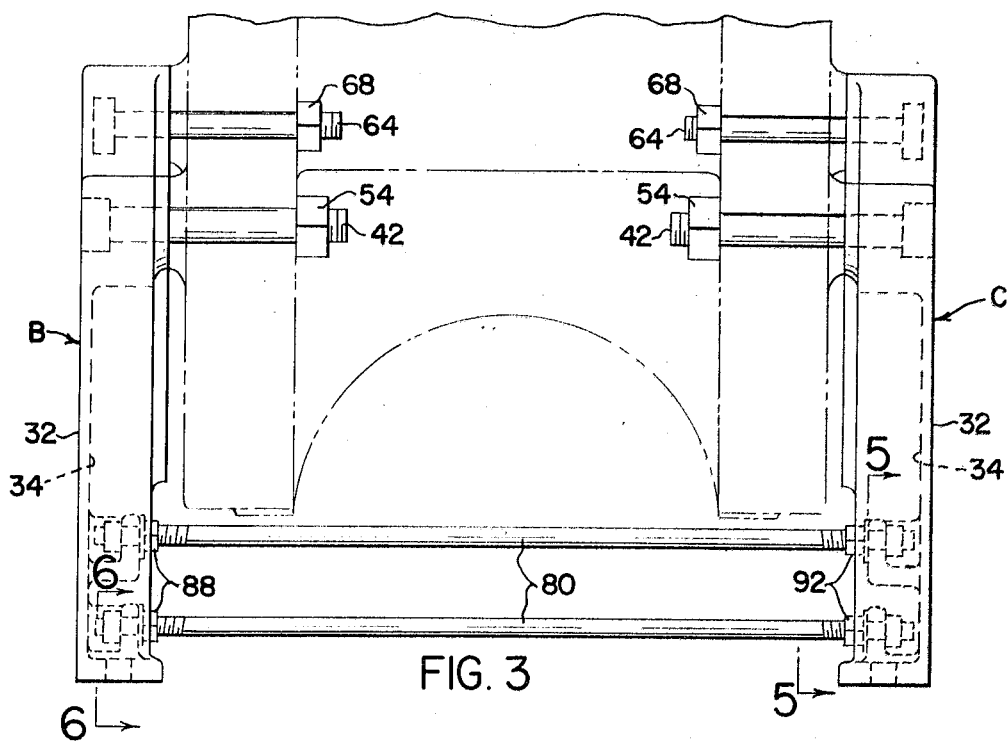
FIG. 3 is an enlarged front elevational view looking in the direction of arrows 3—3 of FIG. 2.
Figure 8:
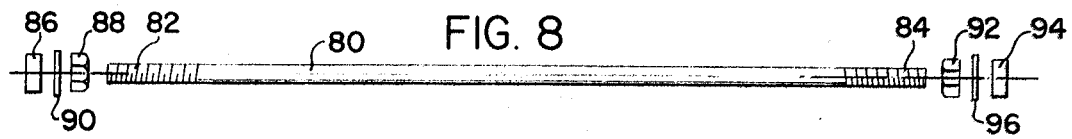
FIG. 8 is an elevational view of a tie rod used with the improved connection of the present invention.

Referring now to the drawings, wherein the showings are for purposes of illustrating the preferred embodiment of the invention only and not for purposes of limiting same, FIG. 1 shows a press A of the type including a frame 12 reciprocatingly supporting a slide 14 which cooperates with a bed 16 for acting on workpieces. A motor 18 is mounted on frame 12 for driving a flywheel 20 through a belt or chain 22. Flywheel 20 drives an eccentric crank 24 which imparts reciprocating motion to connecting rod 26 which is connected to slide 14 as by swivel 28.

Press A includes a pair of parallel spaced-apart legs B and C. In the arrangement shown, press A is an inclinable press which can be inclined so that bed 16 is not horizontal to accommodate various arrangements for feeding and discharging workpieces. Each leg B and C includes an outer surface 32 and an inner surface 34. Inner surfaces 34 on legs B and C face one another while outer surfaces 32 face in opposite directions. Each leg B and C includes a peripheral flange 36 projecting inward substantially perpendicular to outer surfaces 32 for reinforcing and stiffening legs B and C. Each leg may further include any desirable number of reinforcing ribs as shown at 38 for leg C in FIG. 2. Each leg B and C has a bore 40 therethrough for receiving a bolt 42 which extends through bores 44 in frame 12. Each leg B and C is cast with a thickened metal portion as shown at 46 for leg C in FIG. 2 which extends substantially the entire width of peripheral flanges 36. With thickened portion 46, it is possible to countersink bores 40 as at 48 to receive enlarged heads 50 of bolts 42. The outer surface of enlarged heads 50 will then be flush or below outer surfaces 32 of legs B and C. Enlarged heads 50 may have a splined centrally located recess therein for receiving a wrench to prevent rotation of bolts 42 while nuts 54 are tightened thereon to bear against inner surfaces 56 of depending spaced-apart portions 58 of frame 12. With the arrangement described, it will be apparent that frame 12 can be pivoted around bolts 42 relative to legs B and C. Legs B and C are formed with another thickened portion 60 having a thickness substantially the same as the width of peripheral flanges 36. An elongated arcuate slot 62 is formed through each leg B and C for receiving bolts 64 which extend through bores 66 in depending portions 58 of frame 12. Nuts 68 are threaded onto bolts 64 and tightened to bear against inner surfaces 56 of depending portions 58. An arcuate recess 70 is formed in outer surfaces 32 at thickened portions 60 adjacent slots 62 for receiving enlarged heads 72 of bolts 64. Enlarged heads 72 will then be flush or below outer surfaces 32. The bottoms of recesses 70 are provided with a plurality of vertically spaced triangular depressions 76 which define corner sections of a square of slightly larger area than square heads 72 of bolts 64.

Opposite corner sections of enlarged square heads 72 are received in depressions 76 in various inclined positions of frame 12.

In accordance with the preferred arrangement, tie rod means 80 are provided for connecting legs B and C securely together and reinforcing the legs against deformation. Tie rods 80 have right hand threads 82 on one end portion thereof and left hand threads 84 on the other end portion thereof. Right hand threads 82 threadedly receive right hand threaded nuts 86 and 88, and washer 90, while left hand threads 84 threadedly receive left hand threaded nuts 92 and 94, and washer 96.

In accordance with a preferred arrangement, each leg B and C is provided with a pair of horizontally and vertically spaced attaching means D located adjacent inner surfaces 34 thereof. In the preferred arrangement, attaching means D is formed integrally with legs B and C when they are cast. Each attaching means D for connecting tie rods 80 to legs B and C is defined by a bracket having a substantially U-shaped slot 102 and a pair of spaced-apart arms 104 located on opposite sides of slot 102. Arms 104 have inner surfaces 106 facing inner surfaces 34 of legs B and C, and spaced outwardly therefrom to define a tie rod connecting space E. In the preferred arrangement, slot 102 extends substantially vertically and has an open upper portion. Tie rod connecting space E is also open at its upper portion. Each attaching means D further includes a pair of spaced-apart parallel side webs 108 extending between arms 104 and inner surfaces 34 of legs B and C. Attaching means D further includes a bottom web 110 extending between inner surfaces 34 of legs B and C, and arms 104. Slot 102 has a bottom portion 112 and upper surface 114 of bottom web 110 is located below bottom portion 112 of slot 102. Arms 104, side webs 108 and bottom web 110 are formed integral with one another and with legs B and C to define a pocket identified as tie rod connecting space E. Nuts 86 and 94 are square so that opposite parallel sides thereof cooperate with parallel facing surfaces 118 of side webs 108 to define abutment means which prevents rotation of nuts 86 and 94 relative to attaching means D. Facing surfaces 118 of side webs 108 are spaced-apart a distance slightly greater than the width of nuts 86 and 94. The rod portion of tie rod 80 has a diameter slightly less than the width of slots 102 so that the tie rod can be received in slot 102. Nuts 86 and 94 define enlarged connecting means positioned on opposite end portions 82 and 84 of tie rod 80. Facing surfaces 118 of side webs 108 are also spaced-apart a distance greater than the width of slot 102 and extends substantially parallel to slot 102.

Figure 4:
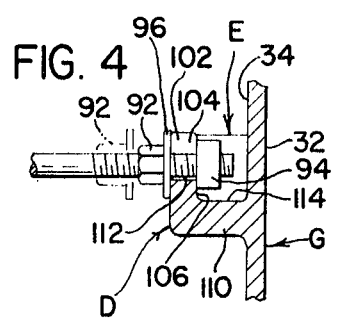
FIG. 4 is a cross-sectional elevational view looking in the direction of arrows 4—4 of FIG. 2.
Figure 5:
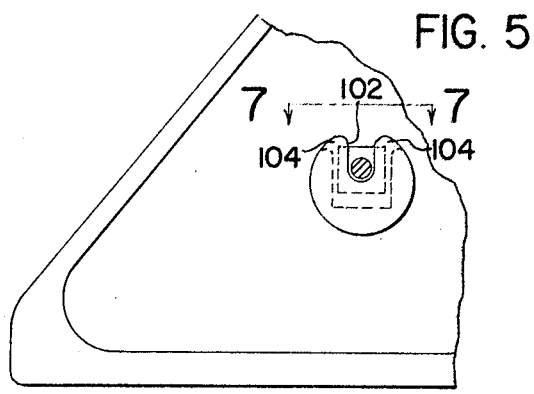
FIG. 5 is a partial side elevational view looking in the direction of arrows 5—5 of FIG. 3.
Figure 6:
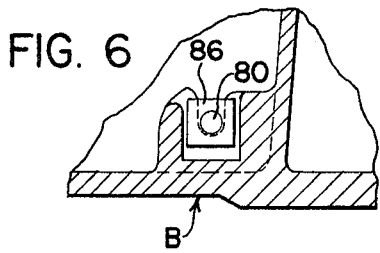
FIG. 6 is a cross-sectional side elevational view looking in the direction of arrows 6—6 of FIG. 3.
Figure 7:
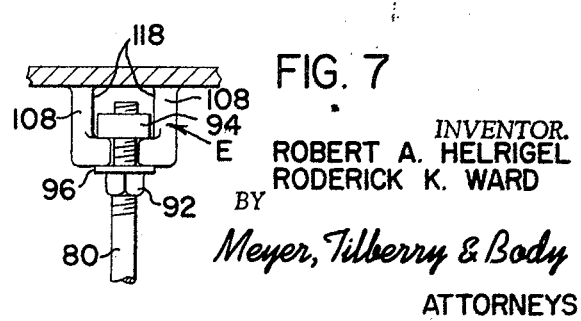
FIG. 7 is a plan view looking in the direction of arrows 7—7 of FIG. 5.

In attaching connecting rods 80 to attaching means D, nuts 88 and 92 are threaded well onto end portions 82 and 84 such as to the shadow line position shown for nut 92 in FIG. 4. Washers 90 and 96 are then placed on end portions 82 and 84 in contact with nuts 88 and 92. Nuts 86 and 94 are then threaded slightly onto end portions 82 and 84. A tie rod 80 is then positioned vertically above a pair of oppositely aligned attaching means D on legs B and C. The tie rod is then lowered vertically so that the rod portion thereof is received in slots 102 while nuts 86 and 94 are received in tie rod connecting spaces E. Tie rod 80 is then rotated by means of a wrench for tensioning the rod while nuts 86 and 94 move toward one another and thread further upon oppositely threaded end portions 82 and 84. Nuts 86 and 94 then bear tightly against inner surfaces 106 of arms 104 on the bracket defined by attaching means D. Nut 92 is then moved from the shadow line position shown in FIG. 4 to the solid line position so that washer 96 bears snugly against the outer surfaces of arms 104. The same operation is performed for nut 88 and washer 90 on end portion 82 of rod 80. This securely locks the tie rod to legs B and C, and reinforces legs B and C against bending in opposite lateral directions.

It will be readily recognized that various other arrangements are possible although they will not be as good as the preferred embodiment. For example, it is possible to form rod 80 in two pieces and form enlarged heads integrally on the opposite end portions thereof for reception in tie rod connecting spaces E. A turnbuckle can then be used for drawing the two rod portions toward one another for tensioning the rods and holding the legs. Such an arrangement does make it difficult to apply lock nuts such as 88 and 92 for preventing movement of the tie rod in both directions and reinforcing the legs against lateral bending in two directions.

While the invention has been described with reference to a preferred embodiment, it is obvious that modifications and alterations will occur to others skilled in the art upon the reading and understanding of this specification. The present application includes all such equivalent modifications and alterations, and is limited only by the scope of the claims.

Having thus described our invention, we claim:

1. In a press of the type including frame means for reciprocatingly supporting slide means which cooperates with bed means for acting on workpieces, said frame means including a pair of spaced-apart legs having inner surfaces facing one another and outer surfaces, tie rod means for connecting said legs together, attachment means on said inner surfaces of said legs for attaching said tie rod means to said legs, said attachment means including a bracket having a slot and a pair of arms in spaced-apart relationship to said inner surfaces of said legs for defining a tie rod connecting space, said tie rod means having a rod portion dimensioned to fit in said slot of said bracket and opposite end portions, said rod portion being received in said slot, enlarged connecting means on said opposite end portions of said tie rod means for connecting said tie rod means to said bracket, said enlarged connecting means being received in said tie rod connecting space between said inner surfaces of said arms and said inner surfaces of said legs, said enlarged connecting means being dimensioned to abut said inner surfaces of said arms on opposite sides of said slot, and tensioning means for placing said rod portion of said tie rod means in tension and drawing said enlarged connecting means on said opposite end portions toward one another to bear against said inner surfaces of said arms and securely hold said legs together whereby the connections between said legs and said tie rod means are located entirely on the inner surfaces of said legs and no projections appear on said outer surfaces of said legs.

2. The device of claim 1 and further including cooperating abutment means on said bracket and said enlarged connecting means for holding said enlarged connecting means against rotation relative to said bracket.

3. The device of claim 2 wherein said opposite end portions of said tie rod means have opposite threads thereon and said enlarged connecting means comprises a pair of oppositely threaded nuts threaded onto said opposite end portions of said tie rod means.

4. The device of claim 1 wherein said attachment means on said inner surfaces of said legs is formed integral with said legs.

5. The device of claim 4 wherein said bracket includes a pair of spaced-apart side webs extending between said inner surfaces of said legs and said inner surfaces of said arms, said webs being spaced-apart a distance greater than the width of said slot and extending substantially parallel to said slot.

6. The device of claim 5 and further including a bottom web extending between said inner surfaces of said legs and said inner surfaces of said arms, said slot having a bottom portion, said bottom web intersecting said arms below said bottom portion of said slot, and said bottom web connecting said pair of spaced-apart side webs.

7. The device of claim 6 wherein said pair of spaced-apart side webs have parallel spaced-apart facing surfaces defining abutment means and said enlarged connecting means has parallel spaced-apart oppositely facing surfaces defining abutment means, said abutment means on said side webs and on said enlarged connecting means cooperating with one another for holding said enlarged connecting means against rotation.

8. The device of claim 7 wherein said opposite end portions of said tie rod means are oppositely threaded and said enlarged connecting means comprises oppositely threaded nuts threaded onto said opposite end portions of said tie rod means.

9. The device of claim 1 wherein said slot is substantially U-shaped and extends substantially vertically, said slot having an open upper portion, and said tie rod connecting space having an open upper portion, whereby said tie rod means may be positioned above said attachment means in a substantially horizontal position and lowered so that said rod portion is received in said said slots and said enlarged connecting portions are received in said tie rod connecting spaces.

10. The device of claim 1 wherein said opposite end portions of said rod are oppositely threaded and said enlarged connecting means comprises a pair of oppositely threaded nuts threaded onto said opposite end portions of said rod, said arms of said bracket having outer surfaces, and a pair of locking nuts threaded onto said opposite end portions of said rod for engaging said outer surfaces of said arms.

11. The device of claim 1 wherein each of said legs has at least two of said brackets, each bracket on one leg being laterally aligned with a bracket on the other leg to define at least two pair of oppositely disposed brackets, said tie rod means comprising a pair of tie rods for connection with said two pairs of oppositely disposed brackets.

12. A press frame leg having an inner surface and an outer surface, attachment means on said inner surface for attaching tie rod means to said leg, said attachment means including a bracket having a slot and a pair of arms in spaced-apart relationship on opposite sides of said slot, said arms having inner surfaces facing said inner surface of said leg, said inner surfaces of said arms being positioned in outwardly spaced relationship to said inner surface of said leg for defining a tie rod connecting space, whereby a tie rod having a rod portion and an enlarged connecting means on an end portion thereof is connectable to said leg by positioning the rod portion in said slot and the enlarged connecting means in said tie rod connecting space.

13. The device of claim 12 where said slot is substantially U-shaped and extends substantially vertically, said slot having an open upper portion, and said tie rod connecting space having an open upper portion.

14. The device of claim 12 wherein said leg has a pair of said brackets on said inner surface thereof in horizontally spaced relationship.

15. The device of claim 12 wherein said bracket is formed integral with said leg.

16. The device of claim 15 wherein said bracket includes a pair of parallel spaced-apart side webs extending between said inner surface of said leg and said inner surfaces of said arms, said webs being spaced-apart a distance greater than the width of said slot and extending substantially parallel to said slot.

17. The device of claim 16 and further including a bottom web extending between said inner surface of said leg and said inner surfaces of said arms, said slot having a bottom portion, said bottom web intersecting said arms below said bottom portion of said slot, and said bottom web connecting said side webs.

18. The device of claim 17 wherein said slot is substantially U-shaped and extends substantially vertically, said slot having an open upper portion, and said tie rod connecting space having an open upper portion.

* * * * *